US008873639B2

(12) United States Patent
Prasad et al.

(10) Patent No.: US 8,873,639 B2
(45) Date of Patent: Oct. 28, 2014

(54) SYSTEM AND METHOD FOR DEMULTIPLEXING AN MPEG-2 TRANSPORT STREAM

(75) Inventors: Vikas K. Prasad, Bangalore (IN); Karthikeyan Natesan, Trichy (IN); Vinay Ramakrishna, Bangalore (IN)

(73) Assignee: Ittiam Systems (P) Ltd, Bangalore (IN)

( * ) Notice: Subject to any disclaimer, the term of this patent is extended or adjusted under 35 U.S.C. 154(b) by 1571 days.

(21) Appl. No.: 12/350,230

(22) Filed: Jan. 8, 2009

(65) Prior Publication Data

US 2010/0172420 A1 Jul. 8, 2010

(51) Int. Cl.
*H04N 7/12* (2006.01)
*H04N 21/434* (2011.01)
*H04N 21/426* (2011.01)
*H04N 21/4385* (2011.01)

(52) U.S. Cl.
CPC ....... *H04N 21/434* (2013.01); *H04N 21/42615* (2013.01); *H04N 21/4341* (2013.01); *H04N 21/4347* (2013.01); *H04N 21/4348* (2013.01); *H04N 21/4385* (2013.01)
USPC ............. 375/240.26; 375/240.02; 375/240.25

(58) Field of Classification Search
None
See application file for complete search history.

(56) References Cited

U.S. PATENT DOCUMENTS

| 5,742,361 | A | * | 4/1998 | Nakase et al. | 375/240.26 |
| 6,118,498 | A | * | 9/2000 | Reitmeier | 348/725 |
| 6,636,222 | B1 | * | 10/2003 | Valmiki et al. | 345/505 |
| 2002/0093517 | A1 | * | 7/2002 | Cheung | 345/629 |
| 2006/0209709 | A1 | * | 9/2006 | Kovacevic | 370/252 |

* cited by examiner

*Primary Examiner* — Faruk Hamza
*Assistant Examiner* — Thinh Tran
(74) *Attorney, Agent, or Firm* — Prakash Nama; Global IP Services, PLLC (57) ABSTRACT

A system and method for demultiplexing an MPEG-2 Transport Stream (TS), is disclosed. In one embodiment, a method of demultiplexing an MPEG-2 TS includes receiving the TS via a system interface, managing the TS via a TS manager, and managing parsing of the TS via a parser manager. Further, the method includes creating a media data stream by parsing the TS via one or more parsers within the parser subsystem, and creating a plurality of decodable units from the media data stream via a framer.

20 Claims, 7 Drawing Sheets

SYSTEM AND METHOD FOR DEMULTIPLEXING AN MPEG-2 TRANSPORT STREAM

FIELD OF THE INVENTION

The present invention relates generally to the Moving Pictures Experts Group; an international standard-2 (hereinafter referred to as 'MPEG-2') for moving pictures compression in a media integrated system. More specifically, the present invention relates to demultiplexing of an MPEG-2 Transport Stream (TS).

BACKGROUND

In general, the multiplexing of packets is a process in which large sized data is divided into appropriate lengths of bit streams called "packets", where additional information related to the data, such as identification, priority, and timing are appended to the packets as a header. One of the video and audio compression standards is the MPEG-2 standard, within which video compression is defined within a given picture and between pictures, and audio is compressed to correspond to the given picture.

Figure 1:
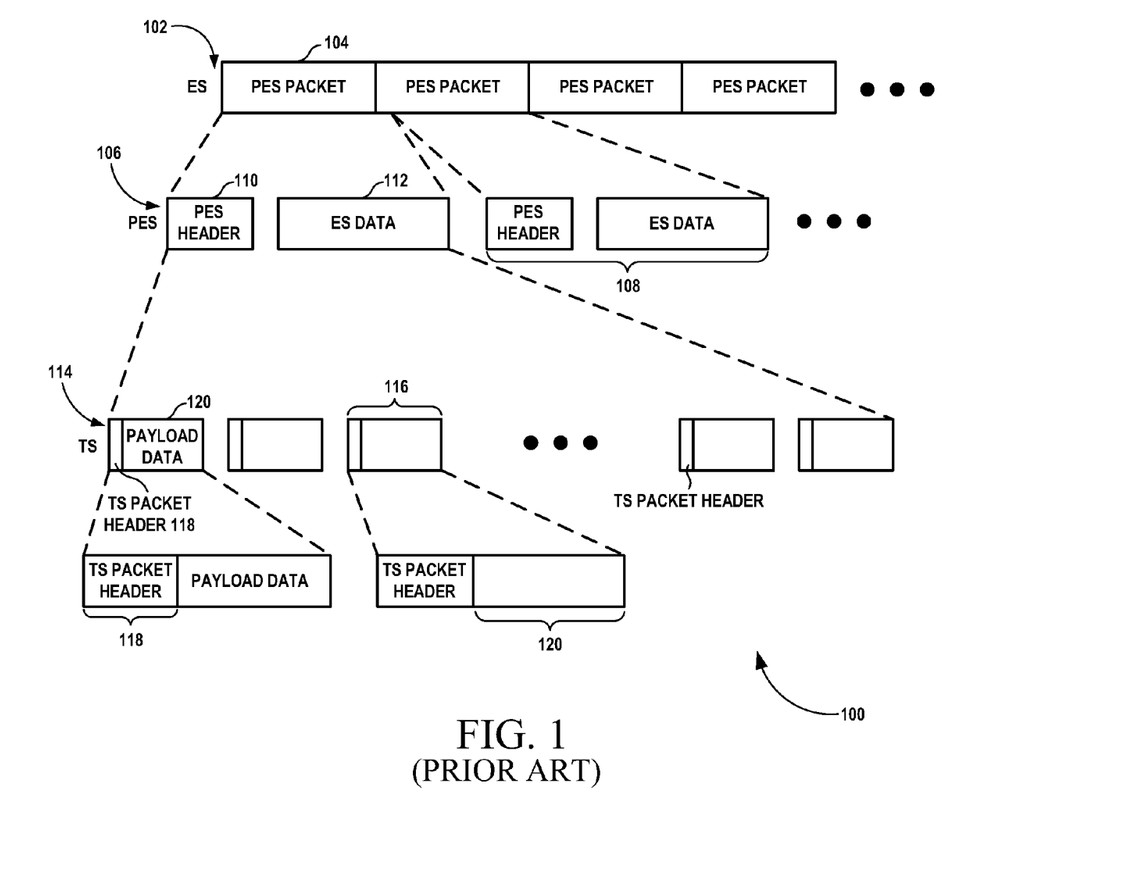
FIG. 1 illustrates a block diagram of a structure of an MPEG-2 Transport Stream (TS) packet, in the context of the invention.
Figure 2:
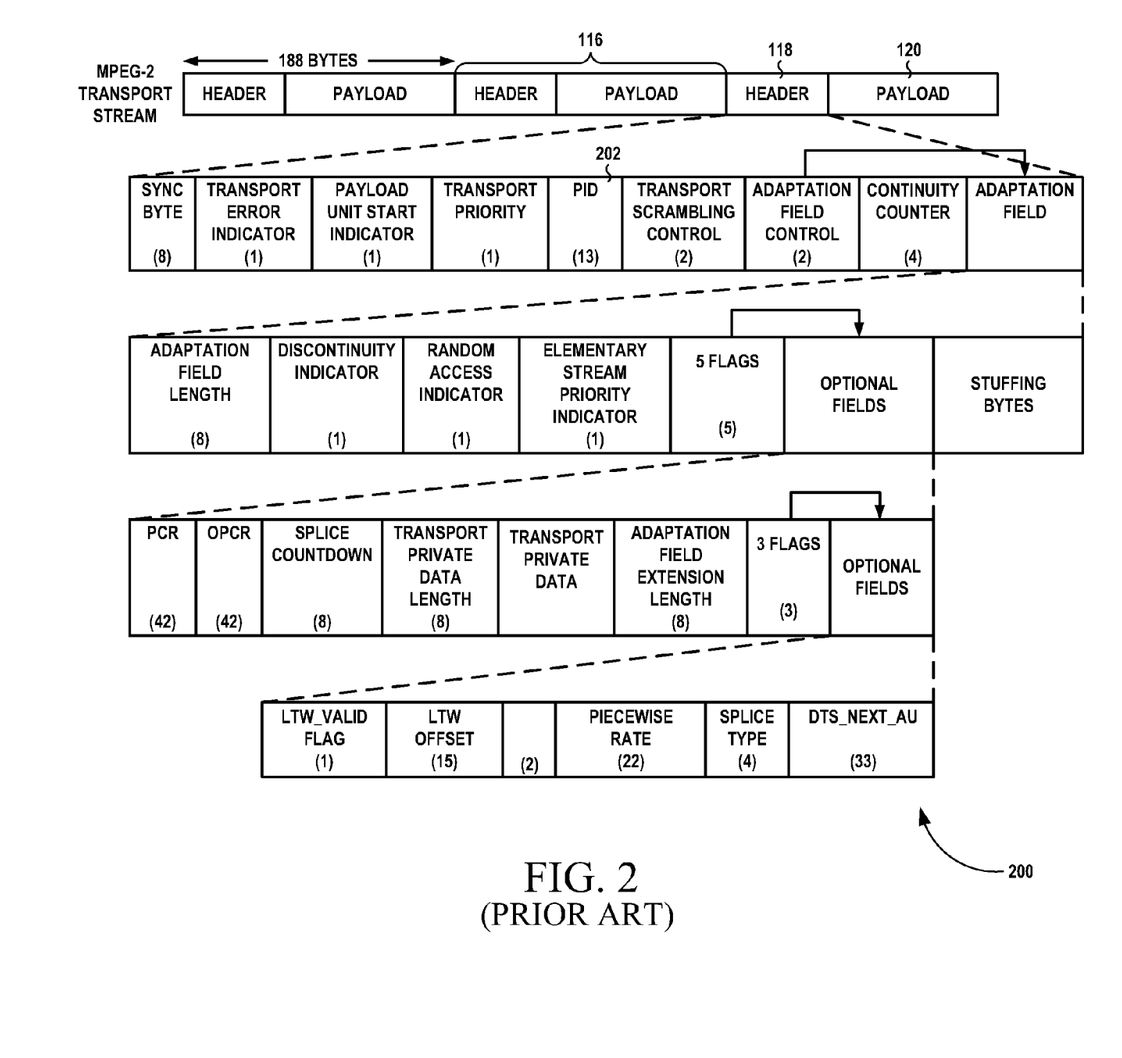
FIG. 2 illustrates a block diagram of the syntax of the TS packet as dictated by the MPEG-2 TS standard, in the context of the invention.

FIGS. 1 and 2, denominated "Prior Art," illustrate an MPEG-2 Elementary Stream (ES) 102 divided into access units 104, wherein the access units 104 may be subdivided into a plurality of Packetized Elementary Stream (PES) packets 108. The PES packets 108 are further subdivided into PES headers 110 and ES data 112. The PES headers 110 contain information related to the data, whereas the ES data 112 contains the data itself. The PES packets 108 comprise a PES 106, which may be further subdivided into a Transport Stream (TS) 114. The TS 114 includes multiple TS packets 116, which themselves include TS packet headers 118 and payload data 120.

FIG. 2 specifically illustrates a breakdown of the TS packet headers 118 into various data fields, including a Packet Identifier (PID) 202. Further, packetized information may generally be multiplexed before being delivered to another location through the TS 114, such as via a network, satellite communication, terrestrial link, etc., where the packetized information is demultiplexed for framing in such a way that coherent video and/or audio are developed.

Currently, the majority of MPEG-2 TS demulitplexers have been implemented through hardware solutions, while a few software implementations exist. However, the software implementations differ significantly in scope, module, features offered, and implementation, which are often restricted to International Organization for Standardization/International Electrotechnical Commission (ISO/IEC) standard 13818-1. Furthermore, most of these software implementations do not have the capability of demultiplexing TS with a synchronization layer as defined in ISO/IEC standard 14496-1. The synchronization layer demultiplexing, which is generally not provided in other solutions, is needed to support multimedia standards, like Digital Multimedia Broadcasting (DMB), and so on. Other implementations of the TS demulitplexers found are restricted to hardware and are either not extensible by very nature and/or not scalable.

Generally, one of the key system requirements while dealing with media is framing, in which decodable units are created from the received content within the TS. This is also completely ignored or not scoped by most of the known software implementations. As a consequence, system integration effort may be more towards getting those software implementations working with existing multimedia decoders in a system.

For applications based on the DMB and Digital Video Broadcasting (DVB) standards, the TS demultiplexing is mostly done at the hardware level or by a combination of software for a particular hardware. This especially may be a disadvantage for companies developing applications catering system level intellectual property to multiple vendors or while supporting multiple standards like DVB, DMB, Advanced Television Systems Committee (ATSC), etc. In this case, the applications may not be scalable and hence the extensibility of the applications to support additional features may be limited. Further, these solutions may reduce reusability across the applications.

Additionally, the ability to demultiplex a variety of standards in an efficient manner within a single architecture, independent of the architecture, is not present within the existing MPEG-2 TS demultiplexers.

SUMMARY

A system and method for demultiplexing an MPEG-2 Transport Stream (TS), is disclosed. In one aspect, a method of demultiplexing an MPEG-2 TS includes receiving the TS via a system interface, managing the TS via a TS manager, and managing parsing of the TS via a parser manager. The method further includes creating a media data stream by parsing the TS via one or more parsers within a parser subsystem, capable of handling multiple format inputs, wherein the parser manager transfers the TS to the parser subsystem, and creating one or more decodable units from the media data stream via a framer.

In another aspect, a system for demultiplexing an MPEG-2 TS includes a system interface which receives the TS, a TS manager which receives the TS from the system interface, and a parser manager which transfers the TS from the TS manager to a parser subsystem that is capable of handling multiple format inputs. The system further includes one or more parsers within the parser subsystem which parses the TS into a media data stream, and a framer which creates one or more decodable units from the media data stream.

The methods, and/or systems disclosed herein may be implemented by any means for achieving various aspects, and may be executed in a form of a machine readable medium embodying a set of instructions that, when executed by a machine, cause the machine to perform any of the operations disclosed herein.

BRIEF DESCRIPTION OF THE DRAWINGS

Embodiments of the present invention are illustrated by way of examples and not limited to the figures of the accompanying drawings, in which like references indicate similar elements and in which.

Other features of the present embodiments will be apparent from the accompanying drawings and from the detailed description that follows.

DETAILED DESCRIPTION

A system and method for demultiplexing an MPEG-2 Transport Stream (TS), is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 3:
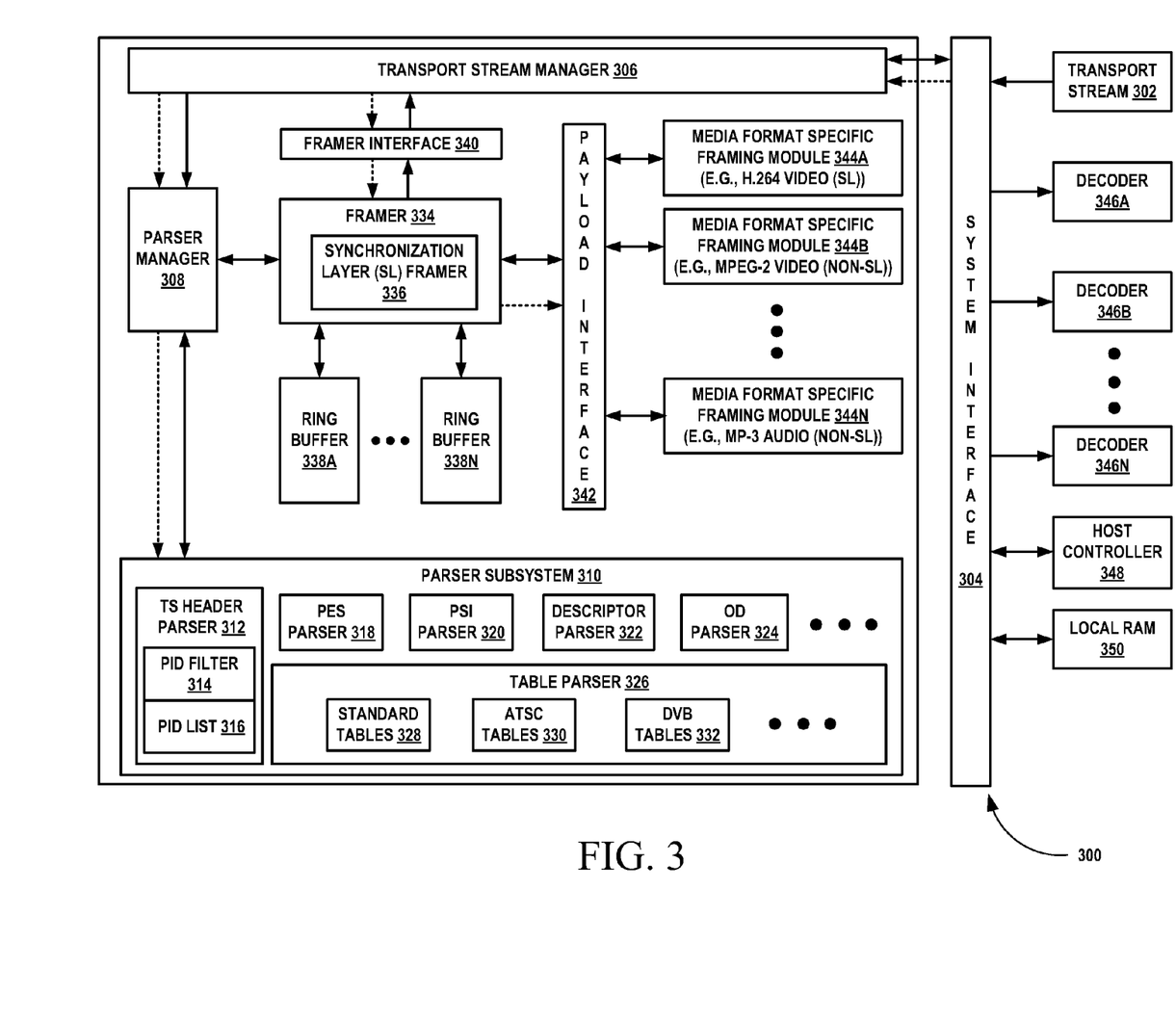
FIG. 3 illustrates a block diagram of an exemplary MPEG-2 TS demultiplexer subsystem, in accordance with an embodiment of the present invention.

FIG. 3 illustrates a block diagram 300 of an exemplary MPEG-2 TS demultiplexer subsystem, in accordance with an embodiment of the present invention. Particularly, FIG. 3 illustrates the MPEG-2 TS demultiplexer subsystem 300 which includes a TS manager 306, a parser manager 308, a parser subsystem 310, a framer interface 340, a framer 334, a plurality of ring buffers 338A through 338N, a payload interface 342, and a plurality of media format specific framing modules 344A through 344N. Further, in FIG. 3, dotted lines indicate a control path and continuous lines indicate a media path.

In operation, a system interface 304 coupled to the MPEG-2 TS demultiplexer subsystem 300 receives a TS 302 (also known as TP, MPEG-TS, or M2T). Further, as shown in FIG. 3, the TS manager 306 receives the TS 302 from the system interface 304. Furthermore, as shown in FIG. 3, the parser manager 308 receives the TS 302 from the TS manager 306 and transfers the TS 302 to the parser subsystem 310 for parsing the TS 302 into a media data stream. Additionally, the TS Manager 306 provides an interface to the system via Application Programming Interfaces (APIs) (not shown in FIG. 3). It is appreciated that the APIs ease system integration by providing clear separation of programs, streams, object based interfaces, etc. Further, the TS Manager 306 enhances configurability of internal modules of the MPEG-2 TS demultiplexer subsystem 300 (e.g., setting Program Allocation Table (PAT)/a Program Map Table (PMT)/Program Clock Reference (PCR) intervals, ring buffer sizes/parameters, etc.). The TS Manager 306 is also designed to handle dynamic addition and/or removal of programs and/or streams, such as the addition or modification to subtitle display while Audio-Video (AV) playback is in progress, although other instances are considered. It is appreciated that the parser subsystem 310 is capable of handling multiple format inputs (e.g., Digital Video Broadcasting (DVB), Digital Multimedia Broadcasting (DMB), Advanced Television Systems Committee (ATSC), Integrated Services Digital Broadcasting (ISDB), standard formats used in various territories).

In some embodiments, the parser subsystem 310 includes multiple parsers for parsing the TS 302 into the media data stream. As shown in FIG. 3, the multiple parsers within the parser subsystem 310 include but not limited to a TS header parser 312, a packetized elementary stream (PES) parser 318, a program specific information (PSI) parser 320, a descriptor parser 322, an object descriptor (OD) parser 324, and a table parser 326. It is appreciated that allowing a single point of communication from the parser manager 308 to the parser subsystem 310, enables additional parsers to be added to the parser subsystem 310 without fundamental changes to the design of the MPEG-2 TS demultiplexer subsystem 300. This improves both scalability and extensibility of the MPEG-2 TS demultiplexer subsystem 300.

Further, as shown in FIG. 3, the TS header parser 312 includes a Packet Identifier (PID) filter 314 and a PID list 316. In some embodiments, the TS header parser 312 within the parser subsystem 310 parses the TS 302 into TS packets. The TS packets include TS headers and TS payloads. Further, each of the TS headers includes a PID (e.g., 13-bit PID). In one exemplary implementation, the TS header parser 312 identifies and locates the PID from the TS headers. Further, the TS header parser 312 transfers the located PID to the PID filter 314. Furthermore, the PID filter 314 compares the PID with the PID list 316 which includes a list of configured PIDs. Moreover, the TS header parser 312 further parses the remaining TS headers if it is determined that the PID is contained within the PID list 316 based on the outcome of the comparison. Thus, unnecessary parsing of the TS 302 is avoided by only parsing the TS headers if they are contained in the PID list 316.

In some embodiments, a look-up table is maintained by the TS header parser 312 to store state information that is needed to parse a TS payload, for each of the configured PID. This state information specifies the type of the TS payload. For example, the type of the TS payload may correspond to PAT, PMT, and/or audio/video data. Using this state information, the TS header parser 312 passes the TS packets to the corresponding parser within the parser subsystem 310. In one example embodiment, the look-up table is combined with the PID filter 314 in the TS header parser 312. Further, it is appreciated that the reuse of the PID filter 314 may avoid the usage of a separate look-up table in the parser manager 308.

In one embodiment, the PES parser 318 parses packetized elementary stream from the TS 302. The PSI parser 320 parses program specific information from the TS 302. In one exemplary implementation, the PSI parser 320 splits the program specific information from the TS 302 into multiple stages of program specific information and buffers each of the multiple stages of program specific information. Then, the PSI parser 320 parses the each of the buffered multiple stages of program specific information. It is appreciated that, the PSI parser 320 buffers the each of the multiple stages of program specific information without buffering the all of the program specific information first and then parsing all of the buffered program specific information. Partial buffering in this manner reduces the amount of memory allocation necessary. Typically, program specific information packets such as the PAT and PMT come in multiple TS packets. For example, in the case of DVB, where multiple programs are transmitted at a single point of time, the data size of the PAT or PMT may be large and may span across the multiple TS packets. In such a case, the PSI parser 320 splits program specific information into multiple stages of program specific information and buffers each of the multiple stages of program specific information stage by stage. Further, once a particular stage of the program specific information is completely buffered, the PSI parser 320 can parse the buffered stage of the program specific information independently without the need for buffering all of the program specific information and then parsing.

In one embodiment, the descriptor parser 322 and the OD parser 324 parse information containing encoded bit stream information (e.g., audio/video information like codec profile, sampling frequency) to initialize the decoder 346A through 346N. The table parser 326 in the parser subsystem 310 parses tables from the TS 302. As shown in FIG. 3, the table parser 326 includes but not limited to standard tables 328, ATSC tables 330, DVB tables 332, and so on. Since, the standard tables 328, the ATSC tables 330, and the DVB tables 332 are well known to a person skilled in the art, the explanation thereof is omitted. It is appreciated that the parsed information (obtained by parsing tables) may be used by MPEG-2 TS demultiplexer subsystem 300 to construct Electronic Program Guide (EPG). In one example embodiment, the table parser 326 exposes a standard set of interfaces to the parser manager 308 irrespective of type of table to be parsed. It is further appreciated that, by having a standard set of interfaces for the table parser 326, the MPEG-2 TS demultiplexer subsystem 300 can be extended to parse the program specific information for various standards such as DVB, ATSC, DMB by scaling the table parser 326. In this manner, the parser subsystem 310 creates the media data stream by parsing the TS 302 using the one or more parsers described above. Further, the parser manager 308 receives the media data stream from the parser subsystem 310 and transfers the media data stream to the framer 334.

Further, the framer 334 defines the payload interface 342. In one exemplary implementation, the payload interface 342 passes media format specific data from the framer 334 to corresponding the one or more media format specific framing modules 344A through 344N based on encoding format of the TS 302. As shown in FIG. 3, each of the media format specific framing modules 344A through 344N may be associated with specific encoding formats of the TS 302, such as a H.264 video (with or without Synchronization Layer (SL)), an MPEG-2 video (non-SL), a MP-3 audio (non-SL) and the like for handling the media format specific data associated with the encoding formats of the TS 302. It is appreciated that the MPEG-2 demultiplexer subsystem 300 enables additional media format specific framing module(s) to be added as and when new encoding format(s) are added, without fundamental changes to the design of the MPEG-2 TS demultiplexer subsystem 300. This improves both scalability and extensibility of the MPEG-2 TS demultiplexer subsystem 300. Further, corresponding the one or more media format specific framing modules 344A through 344N frame the media format specific data. Moreover, the payload interface 342 receives the framed media format specific data from corresponding the one or more media format specific framing modules 344A through 344N and passes the framed media format specific data to the framer 334. It is appreciated that definition of the payload interface 342 by the framer 334 enables easy extension of support to new encoding formats of the TS 302 in the MPEG-2 TS demultiplexer subsystem 300.

In accordance with above-described embodiments, the framer 334 creates one or more decodable units (e.g., Network Abstraction Layer (NAL) in H.264 video, frame in MPEG-2 video, etc.) from the media data stream. For example, each of the one or more decodable units, which includes a frame header and frame data, is stored in one of the ring buffers 338A through 338N. Further, the frame header includes a frame start pointer, a frame size, a next frame pointer and a frame property flag. It is appreciated that the framer 334 creates the one or more decodable units in such a way that packet loss due to network is taken care by maintaining the state information. Also, it should be noted that the creation of 'correct' one or more decodable units considerably reduces the time-to-market for any multimedia application based on the MPEG-2 TS standard. It is also appreciated that the framer 334 is capable of handling different multimedia streaming standards, like DVB, DMB, etc.

Further, as shown in FIG. 3, the framer 334 includes a synchronization layer framer 336 for framing the media data stream which includes a synchronization layer (e.g., H.264 video stream). For example, in case of a DMB stream, the synchronization layer framer 336 creates one or more decodable units from the DMB stream based on synchronization layer information present in a synchronization layer header of the synchronization layer of the DMB stream. It is appreciated that the synchronization layer framer 336 supports the different encoding formats of the TS 302, thus reusing the modules within the MPEG-2 TS demultiplexer subsystem 300.

Furthermore, the framer 334 stores the one or more decodable units in the one of the ring buffers 338A through 338N. In one example embodiment, the one or more decodable units are stored in the one of the ring buffers 338A through 338N with appropriate boundary markings. Further, it is appreciated that the framer 334 creates the one or more decodable units as and when the media data stream is received from the parser manager 308. This may help improve the system design in two ways. First, this makes the system design more deterministic from timing perspective. For example, the delay involved in framing the media data stream need not be considered during AV synchronization as the latency involved in the framing of the one or more decodable units is minimum (almost zero). Second, by performing framing at the input stage, only buffering of frame data is performed without the need to store headers that are present in the media data stream (but only frame specific information like timestamps are stored along with the frame data).

Further, the framer 334 defines the framer interface 340 for transferring data (e.g., one or more decodable units) from the framer 334 to the TS manager 306 independent of encoding format of the decodable units. It is appreciated that functioning of the framer interface 340 across different encoding formats of the TS 302 makes the TS manager 306 generic and independent of the encoding format of the decodable units. This enables many different framing methods to plug-in custom into the MPEG-2 TS demultiplexer subsystem 300 with minimum efforts.

Further, as shown in FIG. 3, decoders 346A through 346N are communicatively coupled to the MPEG-2 TS demultiplexer subsystem 300, via the system interface 304. In one embodiment, the decoders 346A through 346N receive the one or more decodable units from the TS manager 306. In the embodiment, the framer 334 transfers the one or more decodable units stored in the one of the ring buffers 338A through 338N, to the TS manager 306, via the framer interface 340. In one exemplary implementation, the decoders 346A through 346N decode the one or more decodable units. Furthermore, as shown in FIG. 3, a host controller 348 and a local Random Access Memory (RAM) 350 are communicatively coupled to the MPEG-2 TS demultiplexer subsystem 300, via the system interface 304. Since, the host controller 348 and the local RAM 350 are well known to a person skilled in the art, the explanation thereof is omitted.

Figure 4:
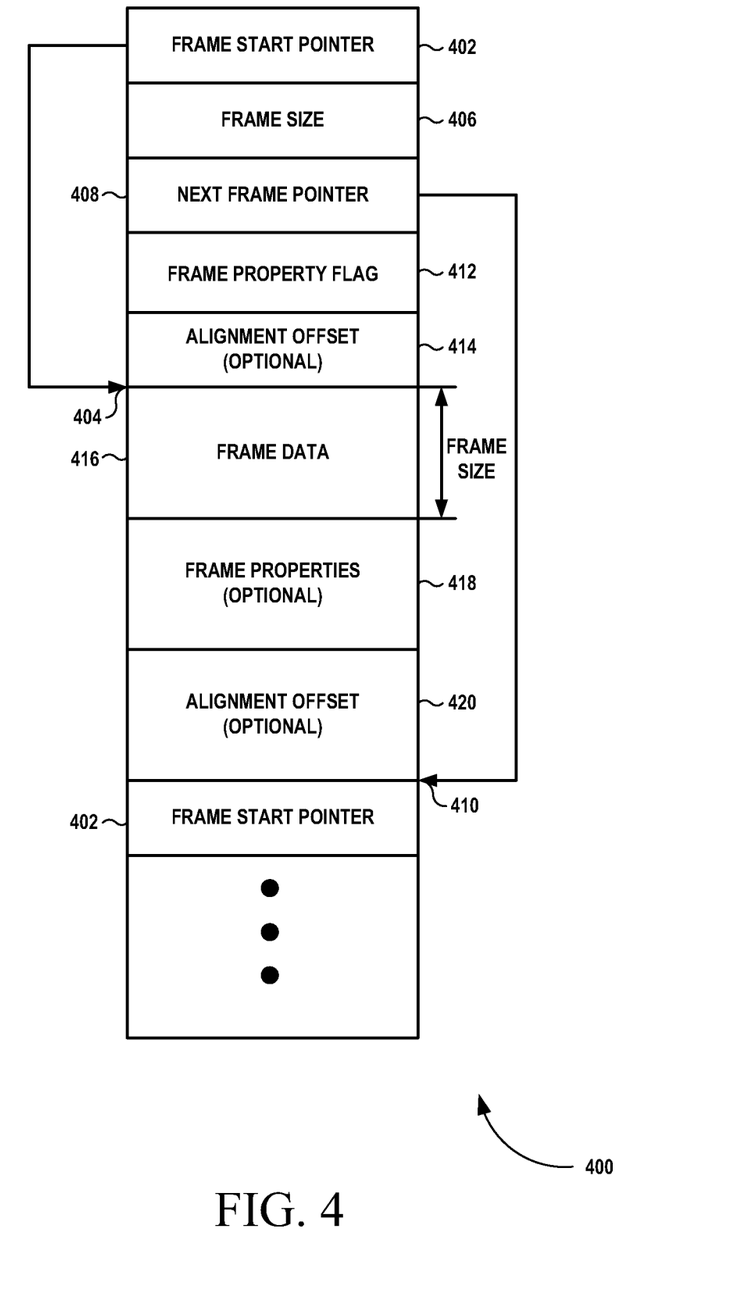
FIG. 4 illustrates a block diagram of an exemplary ring buffer of the MPEG-2 TS demultiplexer subsystem of FIG. 3, according to an embodiment of the present invention.

FIG. 4 illustrates a block diagram 400 of an exemplary ring buffer of the MPEG-2 TS demultiplexer subsystem 300 of FIG. 3, according to an embodiment of the present invention. It is appreciated that the ring buffer 400 is an exemplary embodiment of the ring buffers 338A through 338N of FIG. 3. Particularly, FIG. 4 shows the ring buffer 400 in which one or more decodable units created from a media data stream are stored in associated with a frame header. As shown in FIG. 4, each of the one or more decodable units are stored in the ring buffer 400 along with a frame header which includes a frame start pointer 402, a frame size 406, a next frame pointer 408 and a frame property flag 412, and frame data 416, which corresponds to the decodable unit. Also, the frame header may optionally include alignment offsets 414 and 420 and frame properties 418, according to the example embodiment illustrated in FIG. 4. It is appreciated that storing the one or more decodable units in association with frame headers helps avoid maintenance and reduce complexity of memory for book keeping, as separate memory is need not be allocated for the book keeping.

The frame start pointer 402 indicates a value which refers directly to the frame data 416 stored in the ring buffer 400 (as indicated by a reference numeral 404) using an address of the frame data 416. The frame size 406 indicates a value which corresponds to the size of the frame data 416. The next frame pointer 408 indicates a value which directly refers to the frame start pointer 402 of a next decodable unit in the ring buffer 400 (as indicated by a reference numeral 410). The frame property flag 412 indicates the availability of the frame properties 418 of the decodable unit and is specific to each decodable unit stored in the ring buffer 400. The alignment offsets 414 and 420 are optional fields and indicate data alignment in the ring buffer 400. The frame properties 418 stores properties of the decodable unit, such as Decode Time Stamp (DTS), Presentation Time Stamp (PTS), and the like.

In one embodiment, the properties stored in the frame properties 418 are returned to the framer 334, when the framer 334 reads the decodable units from the ring buffer 400. Further, it is appreciated that the ring buffer 400 supports automatic wrap-around if the decodable unit is partially written and if end of the ring buffer 400 is reached. This is useful in multi-media applications, in case the decodable unit is to be stored in a single contiguous buffer.

Figure 5:
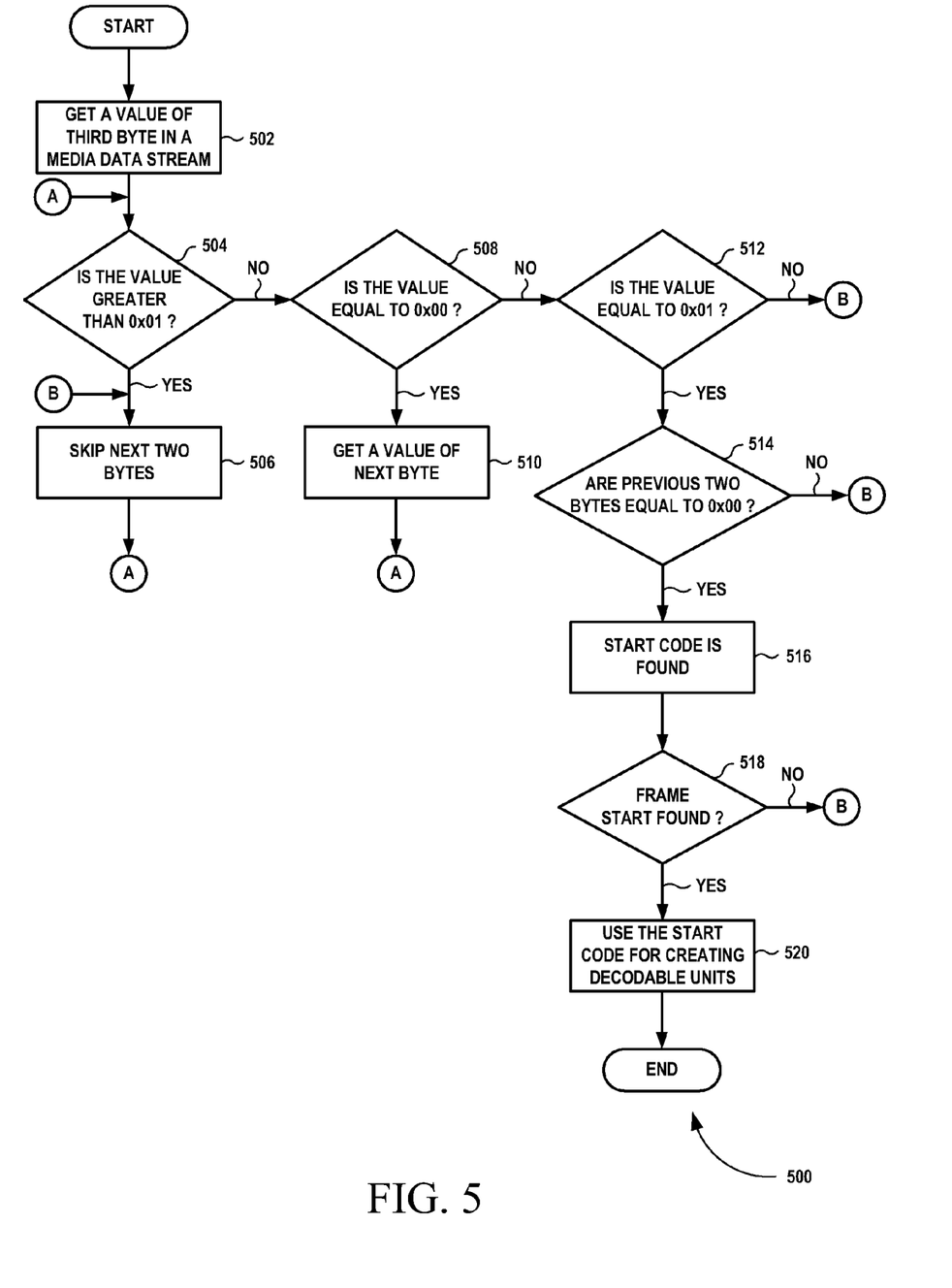
FIG. 5 illustrates a flow chart of an exemplary routine operating within the media format specific framing module of the MPEG-2 TS demultiplexer subsystem of FIG. 3, in accordance with the MPEG-2 Video (non-synchronization layer) standard.

FIG. 5 illustrates a flow chart 500 of an exemplary routine operating within the media format specific framing module 344B of the MPEG-2 TS demultiplexer subsystem 300 of FIG. 3, in accordance with the MPEG-2 video (non-SL) standard, noting that the frame start code for MPEG-2 video is 0x00 0x00 0x01 0x00. At step 502, a value of third byte in a media data stream is obtained. At step 504, a check is made to determine whether the value is greater than 0x01. If the value is greater than 0x01, then next two bytes of the media data stream are skipped (step 506), else a check is made to determine whether the value is equal to 0x00 (step 508). As illustrated in FIG. 5, upon skipping the next two bytes of the media data stream, it is checked whether a value of subsequent byte is greater than 0x01, i.e., step 504 is performed after step 506. If, in step 508, it is determined that the value is equal to 0x00, then a value of next byte of the media data stream is obtained (step 510) and then step 504 is performed. If the check made in step 508 is false, then another check is made to determine whether the value is equal to 0x01 (step 512). If the check made in step 512 is false, then the next two bytes of the media data stream are skipped (step 506) and step 504 is performed. If the check made in step 512 is true, then yet another check is made to determine whether values of previous two bytes are equal to 0x00 (step 514). If the check made in step 514 is false, then the next two bytes of the media data stream are skipped (step 506) and step 504 is performed. If the check made in step 514 is true, then it implies that a start code is found (step 516). In step 518, it is determined whether a frame start is found or not. If the frame start is found, the start code is used for creating one or more decodable units (step 520), else the next two bytes of the media data stream are skipped (step 506) and step 504 is performed. In this manner, the media format specific framing module 344B of the MPEG-2 TS demultiplexer subsystem 300 creates one or more decodable units from a media data stream. It is appreciated that the process 500 facilitates better results in framing of the MPEG-2 video (non-SL) standard without comparing each byte in the received TS packet with the start code.

Figure 6:
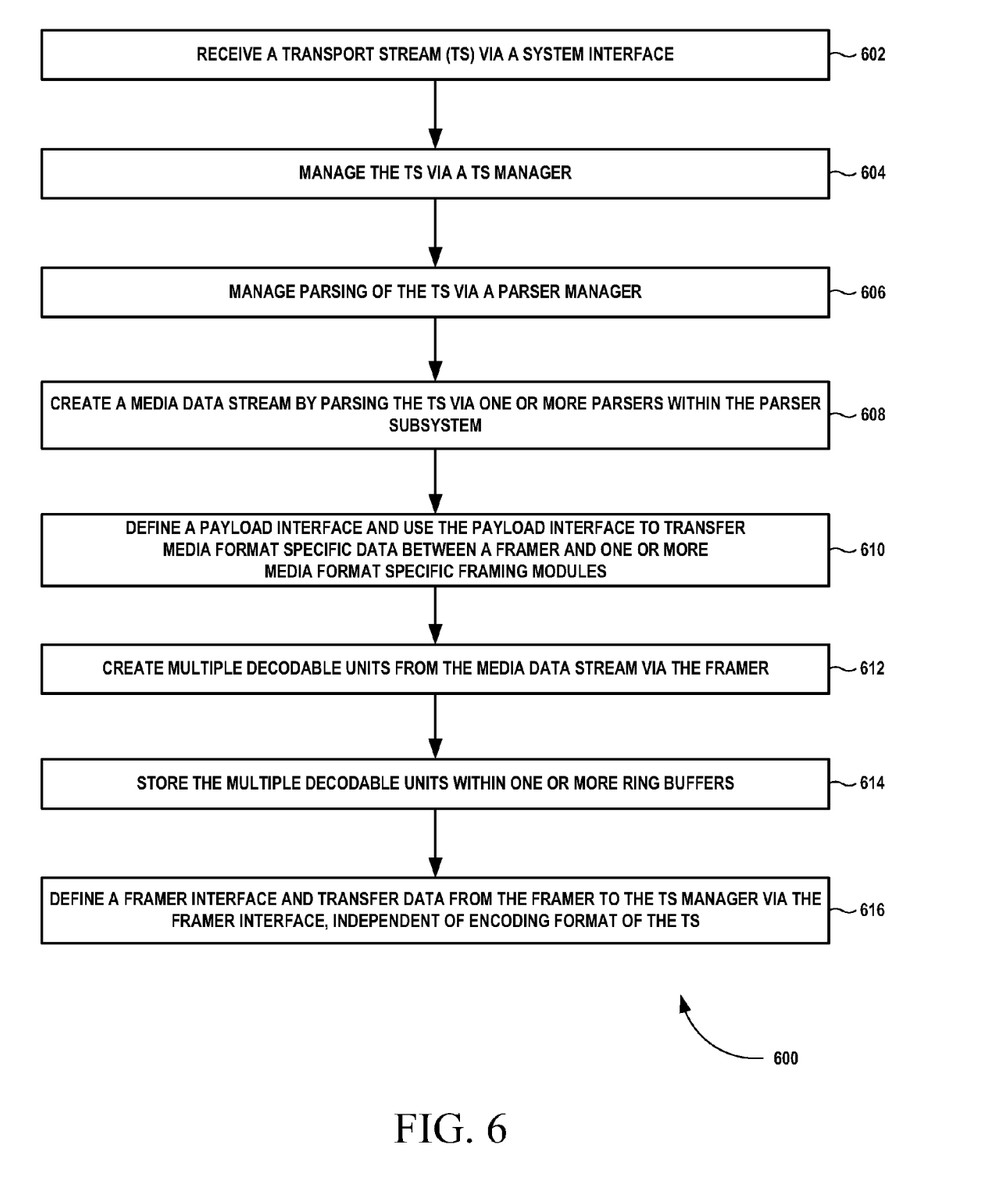
FIG. 6 illustrates a process flow chart of an exemplary method of demultiplexing an MPEG-2 TS using the MPEG-2 TS demultiplexer subsystem of FIG. 3, in accordance with an embodiment of the present invention.

FIG. 6 illustrates a process flow chart of an exemplary method of demultiplexing an MPEG-2 TS using the MPEG-2 TS demultiplexer subsystem 300 of FIG. 3, in accordance with an embodiment of the present invention. In step 602, the TS is received via a system interface. In step 604, the TS is managed via a TS manager. In step 606, parsing of the TS is managed via a parser manager. In one example embodiment, the TS is transferred to a parser subsystem by the parser manager. It should be noted that the parser subsystem is capable of handling multiple format inputs.

In step 608, a media data stream is created by parsing the TS via one or more parsers within the parser subsystem. In one embodiment, the one or more parsers include but not limited to a TS header parser, a PES parser, a PSI parser, a descriptor parser, an OD parser, and a table parser.

In step 610, a payload interface is defined and the payload interface is used to transfer media format specific data of the media data stream between a framer and one or more media format specific framing modules based on encoding format of the TS. In step 612, one or more decodable units are created from the media data stream via the framer. In embodiments, where the media data stream requires framing specific to an encoding format, the payload interface transfers the media format specific data to the appropriate media format specific framing module. The media format specific framing module then frames the media format specific data and passes decodable units to the framer via the payload interface. In some embodiments, the one or more decodable units are created from the media data stream having a synchronization layer via a synchronization layer framer.

In step 614, the one or more decodable units are stored within one or more ring buffers. In step 616, a framer interface is defined and the framer interface is used to transfer data (e.g., one or more decodable units for decoding) from the framer to the TS manager, independent of the encoding format of the TS.

Figure 7:
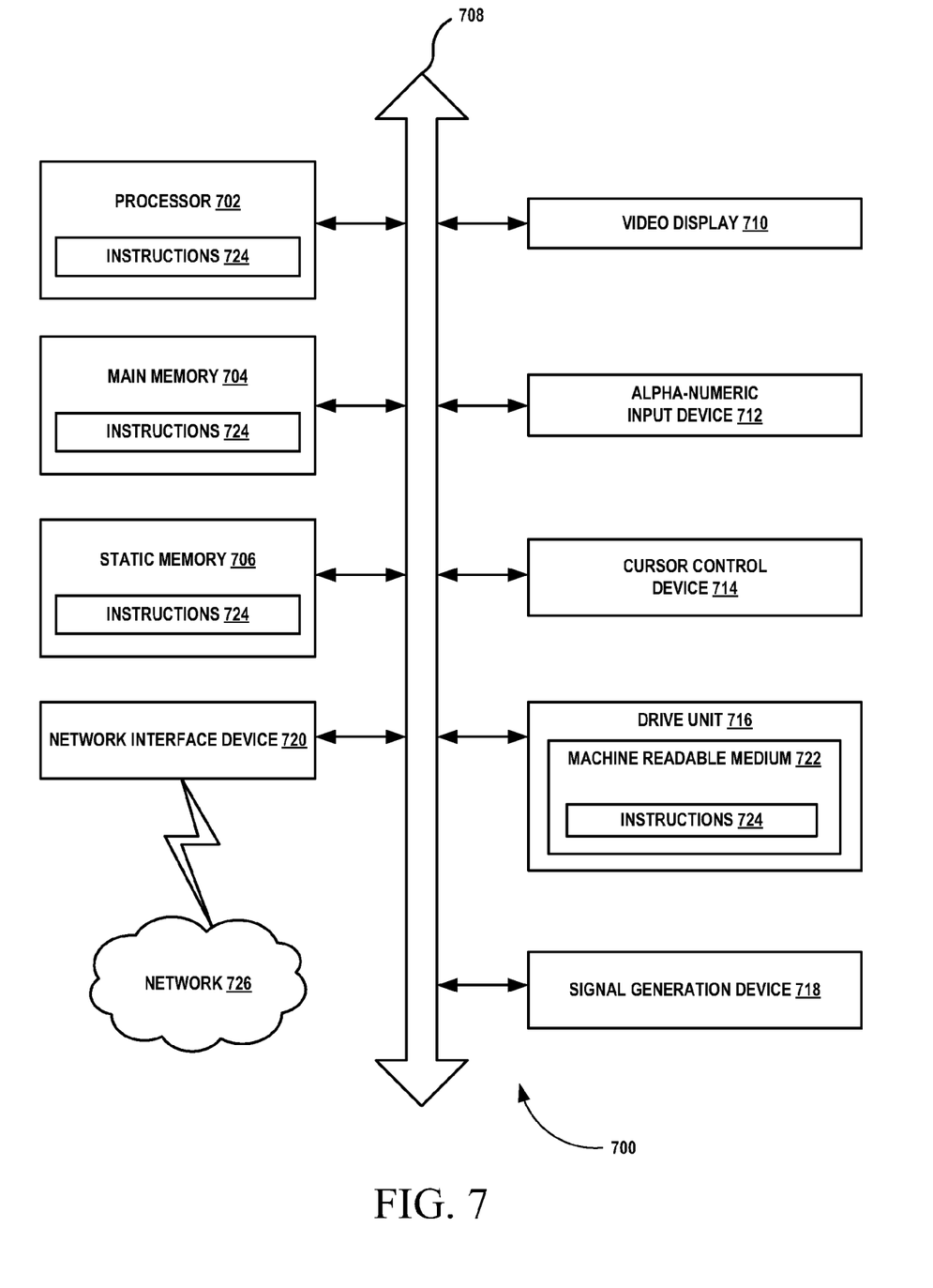
FIG. 7 illustrates a diagrammatic system view of a data processing system in which any of the embodiments disclosed herein may be performed, in accordance with an embodiment of the present invention.

FIG. 7 illustrates a diagrammatic system view 700 of a data processing system in which any of the embodiments disclosed herein may be performed, in accordance with an embodiment of the present invention. Particularly, the diagrammatic system view of FIG. 7 illustrates a processor 702, a main memory 704, a static memory 706, a bus 708, a video display 710, an alpha-numeric input device 712, a cursor control device 714, a drive unit 716, a signal generation device 718, a network interface device 720, a machine readable medium 722, instructions 724 and a network 726.

The diagrammatic system view 700 may indicate a personal computer and/or a data processing system in which one or more operations disclosed herein are performed. The processor 702 may be a microprocessor, a state machine, an application specific integrated circuit, a field programmable gate array, etc. The main memory 704 may be a dynamic random access memory and/or a primary memory of a computer system. The static memory 706 may be a hard drive, a flash drive, and/or other memory information associated with the data processing system.

The bus 708 may be an interconnection between various circuits and/or structures of the data processing system. The video display 710 may provide graphical representation of information on the data processing system. The alpha-numeric input device 712 may be a keypad, keyboard and/or any other input device of text (e.g., a special device to aid the physically handicapped). The cursor control device 714 may be a pointing device such as a mouse. The drive unit 716 may be a hard drive, a storage system, and/or other longer term storage subsystem.

The signal generation device 718 may be a BIOS and/or a functional operating system of the data processing system. The network interface device 720 may perform interface functions (e.g., code conversion, protocol conversion, and/or buffering) required for communications to and from the network 726 between a number of independent devices (e.g., of varying protocols). The machine readable medium 722 may provide instructions on which any of the methods disclosed herein may be performed. The instructions 724 may provide source code and/or data code to the processor 702 to enable any one or more operations disclosed herein.

For example, a storage medium having instructions that, when executed by a computing platform, result in execution of a method of demultiplexing an MPEG-2 TS associated with an application and a session, the method includes receiving a TS via the system interface 304, managing the TS via the TS manager 306, and managing parsing of the TS via the parser manager 308. In one example embodiment, the parser manager 308 transfers the TS to the parser subsystem 310, capable of handling multiple format inputs. Further, the storage medium has instructions to create a media data stream from the TS.

For creating the media data stream, the storage medium has instructions to parse the TS via the TS header parser 312 within the parser subsystem 310 into TS packets (e.g., containing TS headers and TS payloads), identify type of the TS packets via the TS header parser 312, and pass the TS packets to corresponding one or more parsers (e.g., the PES parser 318, the PSI parser 320, the descriptor parser 322, the OD parser 324 of FIG. 3) within the parser subsystem 310 based on the type of the TS packets via the TS header parser 312. The storage medium has further instructions to parse tables from the TS via the table parser 326 which exposes a standard set of interfaces to the parser manager 308 independent of type of table to be parsed.

The storage medium also has instructions to parse program specific information from the TS via the PSI parser 320 by splitting the program specific information into a plurality of stages of program specific information, buffering each of the plurality of stages of program specific information, without buffering all of the program specific information, and parse each of the plurality of stages of program specific information. Moreover, the storage medium has instructions to create a plurality of decodable units from the media data stream via the framer 334.

In addition, the storage medium has instructions to identify and locate the PID from the TS headers via the TS header parser 312, and compare the PID with the PID list 316 via the PID filter 314. In one example embodiment, the PID list 316 includes a list of configured PIDs. Further, the storage medium has instructions to parse remaining the TS headers via the TS header parser 312, if the PID is contained within the PID list 316.

The above-described technique assures that the MPEG-2 TS demultiplexer subsystem supports various TS formats like MPEG-2 TS, DMB stream, DVB stream, as a single component and enhances the reusability of the component across various applications based on the MPEG-2 TS. Further, it is appreciated that the modular design enables better maintainability of the MPEG-2 TS demultiplexer subsystem. In addition, the above described MPEG-2 TS demultiplexer subsystem provides an elaborate testing process as a subsystem, which includes testing for conformance with industry defined standards, and enables simulation of the subsystem under various network packet loss conditions. Also, the MPEG-2 TS demultiplexer subsystem supports handling of multiple consecutive TS packets in a single buffer. This is needed in applications, where the TS packets are sent over Real-time Transport Protocol (RTP) as defined in Internet Engineering Task Force-Requests for Comments (IETF-RFC) 2250.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuitry (ASIC)).

What is claimed is:

1. A method of demultiplexing an MPEG-2 transport stream comprising:
    receiving the transport stream via a system interface;
    managing the transport stream via a transport stream manager;
    managing parsing of the transport stream via a parser manager, wherein the parser manager transfers the transport stream to a parser subsystem, and wherein the parser subsystem is capable of handling multiple format inputs;
    creating a media data stream by parsing the transport stream via at least one parser within the parser subsystem, wherein parsing the transport stream comprises:
        parsing program specific information from the transport stream via a transport stream header parser, wherein the program specific information includes program allocation table (PAT) and program map table (PMT), wherein parsing the program specific information comprises:
            splitting each of the PAT and PMT into a plurality of stages via a program specific information parser;
            buffering each of the plurality of stages of the PAT or PMT stage by stage via the program specific information parser; and
            upon a stage is buffered, parsing the buffered stage of the PAT or PMT independently without need for buffering all the stages of the PAT or PMT via the program specific information parser; and
    creating a plurality of decodable units from the media data stream via a framer.

2. The method of claim 1, wherein parsing the transport stream further comprises:
    parsing tables from the transport stream via a table parser, wherein the table parser exposes a standard set of interfaces to the parser manager independent of type of table to be parsed.

3. The method of claim 1, wherein parsing the transport stream further comprises:
   parsing the transport stream via the transport stream header parser within the parser subsystem into transport stream packets, wherein the transport stream packets comprise transport stream headers and transport stream payloads;
   identifying type of the transport stream packets via the transport stream header parser; and
   passing the transport stream packets to corresponding the at least one parser based on the type of the transport stream packets via the transport stream header parser.

4. The method of claim 3, further comprising:
   identifying and locating a packet identifier from the transport stream headers via the transport stream header parser;
   comparing the packet identifier with a packet identifier list via a packet identifier filter within the transport stream header parser, wherein the packet identifier list comprises a list of configured packet identifiers; and
   parsing remaining the transport stream headers via the transport stream header parser, if the packet identifier is contained within the packet identifier list.

5. The method of claim 1, further comprising:
   defining a framer interface; and
   transferring data between the framer and the transport stream manager, via the framer interface, independent of encoding format of the transport stream.

6. The method of claim 1, further comprising:
   defining a payload interface;
   passing media format specific data of the transport stream from the framer to at least one media format specific framing module via the payload interface, wherein the media format specific data is passed to corresponding the at least one media format specific framing module based on encoding format of the transport stream;
   framing the media format specific data via the at least one media format specific framing module;
   receiving the framed media format specific data from the at least one media format specific framing module via the payload interface; and
   passing the framed media format specific data to the framer via the payload interface.

7. The method of claim 1, further comprising:
   framing the media data stream via a synchronization layer framer, wherein the media data stream includes a synchronization layer, and wherein the synchronization layer framer supports different encoding formats.

8. The method of claim 1, further comprising:
   storing the plurality of decodable units within at least one ring buffer.

9. The method of claim 8, wherein a frame header is stored within the at least one ring buffer, and wherein the frame header further comprises a framer start pointer, a frame size, a next frame pointer, and a frame property flag.

10. A non-transitory machine-readable storage medium embodying a set of instructions that, when executed by a machine, causes the machine to perform a method of demultiplexing an MPEG-2 transport stream, the method comprising:
   receiving the transport stream via a system interface;
   managing the transport stream via a transport stream manager;
   managing parsing of the transport stream via a parser manager, wherein the parser manager transfers the transport stream to a parser subsystem, and wherein the parser subsystem is capable of handling multiple format inputs;
   creating a media data stream by parsing the transport stream via at least one parser within the parser subsystem, wherein parsing the transport stream comprises:
      parsing program specific information from the transport stream via a transport stream header parser, wherein the program specific information includes program allocation table (PAT) and program map table (PMT), wherein parsing the program specific information comprises:
         splitting each of the PAT and PMT into a plurality of stages via a program specific information parser;
         buffering each of the plurality of stages of the PAT or PMT stage by stage via the program specific information parser; and
         upon a stage is buffered, parsing the buffered stage of the PAT or PMT independently without need for buffering all the stages of the PAT or PMT via the program specific information parser; and
   creating a plurality of decodable units from the media data stream via a framer.

11. An article comprising:
   a non-transitory machine-readable storage medium having instructions that, when executed by a computing platform, result in execution of a method of demultiplexing an MPEG-2 transport stream associated with an application and a session, comprising:
   receiving the transport stream via a system interface;
   managing the transport stream via a transport stream manager;
   managing parsing of the transport stream via a parser manager, wherein the parser manager transfers the transport stream to a parser subsystem, and wherein the parser subsystem is capable of handling multiple format inputs;
   creating a media data stream from the transport stream by:
      parsing the transport stream via a transport stream header parser within the parser subsystem into transport stream packets, wherein the transport stream packets comprise transport stream headers and transport stream payloads;
      identifying type of the transport stream packets via the transport stream header parser;
      passing the transport stream packets to corresponding at least one parser within the parser subsystem based on the type of the transport stream packets, via the transport stream header parser;
      parsing tables from the transport stream via a table parser, wherein the table parser exposes a standard set of interfaces to the parser manager independent of type of table to be parsed;
      parsing program specific information from the transport stream via the transport stream header parser by:
         splitting each of program allocation table (PAT) and program map table (PMT) of the program specific information into a plurality of stages via a program specific information parser;
         buffering each of the plurality of stages of the PAT or PMT stage by stage via the program specific information parser; and
         upon a stage is buffered, parsing the buffered stage of the PAT or PMT independently without need for buffering all the stages of the PAT or PMT via the program specific information parser; and
   creating a plurality of decodable units from the media data stream via a framer.

12. The article of 11, further comprising:
identifying and locating a packet identifier from the transport stream headers via the transport stream header parser;
comparing the packet identifier with a packet identifier list via a packet identifier filter, wherein the packet identifier list comprises a list of configured packet identifiers; and
parsing remaining the transport stream headers via the transport stream header parser, if the packet identifier is contained within the packet identifier list.

13. A system for demultiplexing an MPEG-2 transport stream comprising:
a system interface, wherein the system interface receives the transport stream;
a transport stream manager, wherein the transport stream manager receives the transport stream from the system interface;
a parser manager, wherein the parser manager transfers the transport stream from the transport stream manager to a parser subsystem, and wherein the parser subsystem is capable of handling multiple format inputs;
at least one parser within the parser subsystem, wherein the at least one parser parses the transport stream into a media data stream, wherein the at least one parser comprises:
 a program specific information parser within the parser subsystem, wherein the program specific information parser splits each of program allocation table (PAT) and program map table (PMT) of program specific information into a plurality of stages, wherein the program specific information parser buffers each of the plurality of stages of the PAT or PMT stage by stage, and wherein the program specific information parser, upon a stage is buffered, parses the buffered stage of the PAT or PMT independently without need for buffering all the stages of the PAT or PMT; and
 a framer, wherein the framer creates a plurality of decodable units from the media data stream.

14. The system of claim 13, wherein the at least one parser comprises a table parser, and wherein the table parser exposes a standard set of interfaces to the parser manager independent of type of table to be parsed.

15. The system of claim 13, wherein the at least one parser further comprises:
a transport stream header parser within the parser subsystem, wherein the transport stream header parser parses the transport stream into transport stream packets, wherein the transport stream packets comprise transport stream headers and transport stream payloads, wherein the transport stream header parser identifies type of the transport stream packets, and wherein the transport stream header parser passes the transport stream packets to corresponding the at least one parser based on the type of the transport stream packets.

16. The system of claim 13, further comprising:
a transport stream header parser within the parser subsystem, wherein the transport stream header parser identifies and locates a packet identifier from transport stream headers;
a packet identifier list within the transport stream header parser, wherein the packet identifier list comprises a configured list of packet identifiers; and
a packet identifier filter within the transport stream header parser, wherein the packet identifier filter compares the packet identifier with the packet identifier list, and wherein the transport stream header parser parses remaining the transport stream headers, if the packet identifier is contained within the packet identifier list.

17. The system of claim 13, further comprising:
a framer interface, wherein the framer interface transfers data between the framer and the transport stream manager independent of encoding format of the transport stream.

18. The system of claim 13, further comprising:
at least one media format specific framing module, wherein the at least one media format specific framing module frames media format specific data of the transport stream; and
a payload interface, wherein the payload interface passes the media format specific data from the framer to the at least one media format specific framing module, wherein the media format specific data is passed to corresponding the at least one media format specific framing module based on encoding format, and wherein the payload interface receives the framed media format specific data from the at least one media format specific framing module and passes the framed media format specific data to the framer.

19. The system of claim 13, further comprising:
a synchronization layer framer, wherein the synchronization layer framer frames the media data stream including a synchronization layer, and wherein the synchronization layer framer supports different encoding formats.

20. The system of claim 13, further comprising:
a ring buffer for storing the at least one of the plurality of decodable units.

* * * * *